United States Patent
Eo et al.

(10) Patent No.: US 11,359,143 B2
(45) Date of Patent: Jun. 14, 2022

(54) POLYMER-DISPERSED LIQUID CRYSTAL FILM FOR VEHICLE

(71) Applicants: Hyundai Motor Company, Seoul (KR); Kia Motors Corporation, Seoul (KR); LIVICON, Chungcheongbuk-do (KR)

(72) Inventors: Moon Jung Eo, Gyeonggi-do (KR); Young Jae Jeon, Gyeonggi-do (KR)

(73) Assignees: Hyundai Motor Company, Seoul (KR); Kia Motors Corporation, Seoul (KR); LIVICON, Chungju (KR)

( * ) Notice: Subject to any disclaimer, the term of this patent is extended or adjusted under 35 U.S.C. 154(b) by 112 days.

(21) Appl. No.: 16/229,269

(22) Filed: Dec. 21, 2018

(65) Prior Publication Data
US 2019/0203121 A1    Jul. 4, 2019

(30) Foreign Application Priority Data
Dec. 28, 2017  (KR) .................. 10-2017-0183117

(51) Int. Cl.
G02F 1/1333   (2006.01)
C09K 19/54    (2006.01)
G02F 1/1334   (2006.01)
C09K 19/30    (2006.01)
B60J 3/04     (2006.01)
C09K 19/04    (2006.01)

(52) U.S. Cl.
CPC ........ *C09K 19/544* (2013.01); *C09K 19/3003* (2013.01); *G02F 1/1334* (2013.01); *B60J 3/04* (2013.01); *C09K 2019/0444* (2013.01); *C09K 2019/3016* (2013.01); *C09K 2219/03* (2013.01); *G02F 2203/21* (2013.01)

(58) Field of Classification Search
CPC .............. C09K 19/544; C09K 19/3003; C09K 2019/0444; C09K 2019/3016; C09K 2219/03; G02F 1/1333; G02F 1/1334; G02F 2203/21
USPC ..................................... 252/299.01
See application file for complete search history.

(56) References Cited

U.S. PATENT DOCUMENTS 5,356,557 A * 10/1994 Jubb ............... C09K 19/12
                                               252/299.01
5,409,744 A *  4/1995 Gotoh .............. C08G 59/30
                                                  428/1.53

FOREIGN PATENT DOCUMENTS

KR    10-0269203 B1    10/2000

* cited by examiner

*Primary Examiner* — Geraldina Visconti
(74) *Attorney, Agent, or Firm* — Fox Rothschild LLP

(57) ABSTRACT

Disclosed is a liquid crystal film for a vehicle, including a first electrode, a liquid crystal molecular layer provided on the first electrode, and a second electrode provided on the liquid crystal molecular layer. The liquid crystal molecular layer includes a pre-polymer, a liquid crystal material, and a crosslinking agent.

4 Claims, 2 Drawing Sheets

POLYMER-DISPERSED LIQUID CRYSTAL FILM FOR VEHICLE

CROSS-REFERENCE TO RELATED APPLICATION

This application claims, under 35 U.S.C. § 119(a), the benefit of priority to Korean Patent Application No. 10-2017-0183117, filed Dec. 28, 2017, the entire contents of which is incorporated herein for all purposes by reference.

TECHNICAL FIELD

The present invention relates to a liquid crystal film for a vehicle and a vehicle including the same. The polymer-dispersed liquid crystal film may improve a viewing angle.

BACKGROUND OF THE INVENTION

In the related art, liquid crystals are dispersed in a polymer to form a polymer-dispersed liquid crystal film, which thus displays an image that appears opaque by scattering incident light or that appears transparent by transmitting incident light without scattering. A polymer-dispersed liquid crystal protection film has been mainly utilized as an interior partition or for other interior use. As vehicles are diversified, such a film may be used as a smart window, and the demand for a polymer-dispersed liquid crystal film having no additional light-emitting member is increasing.

A conventional polymer-dispersed liquid crystal protection film has been typically formed of a birefringent nematic liquid crystal material. The birefringent liquid crystal material exhibits a liquid crystal phase within a limited temperature range from −10 to 70° C. Since liquid crystal is an intermediate phase of liquid and solid, it shows a solid phase at low temperatures and a liquid phase at high temperatures. Furthermore, a pre-polymer, which is used in a mixture with the liquid crystal material, is an acrylate-based polymer, which incurs heat yellowing and decomposition at high temperatures and in which shrinkage occurs when the temperature changes from a high temperature to a low temperature, thus deteriorating the durability of the polymer-dispersed liquid crystal protection film. Accordingly, the polymer-dispersed liquid crystal protection film may not be suitable for the used in outer windows and vehicle windows because the external temperature changes frequently and sunlight is directly radiated thereon. For example, when the ambient temperature is −10° C. or less, the liquid crystal phase becomes close to a solid phase, making operation impossible. In addition, the liquid crystal phase becomes close to a liquid phase at high temperatures greater than 70° C., and thus the film turns transparent, whereby the performance of the polymer-dispersed liquid crystal film is undesirably lost. Therefore, in order to apply the polymer-dispersed liquid crystal protection film to the window of a vehicle, it is necessary to develop a polymer-dispersed liquid crystal protection film having high durability even at high temperatures.

SUMMARY OF THE INVENTION

In preferred aspects, the present invention provides a liquid crystal film or a polymer-dispersed liquid crystal film for a vehicle having high durability even at high temperatures and a vehicle including the polymer-dispersed liquid crystal film.

In an aspect, provided is a polymer-dispersed liquid crystal film for a vehicle. The liquid crystal film may include: a first electrode, a liquid crystal layer provided on the first electrode, and a second electrode provided on the liquid crystal layer. The polymer-dispersed liquid crystal molecular layer may include a pre-polymer, a liquid crystal material, and a crosslinking agent.

The term "pre-polymer" as used herein refers to a monomer, a precursor unit, or a mixture thereof which can be reactive to polymerization reaction, e.g., thermal or radiation (e.g., UV) curing. Preferably, the pre-polymer may suitably include with unreacted monomers or intermediated state before fully cured polymer.

The term "liquid crystal" or "liquid crystal material" as used herein refers to a liquid or fluid material that can exist in a state behaving like a solid crystal, e.g., orienting along a specific direction (axis), upon external application of electric or magnetic field. Preferred liquid crystal may dominantly include rod-shaped organic molecules which can align along the longer axis by an external magnetic or electric field so that it is in a nematic phase.

The polymer-dispersed liquid crystal layer may have a transition temperature of about 100 to 120° C., at which a nematic phase may be transformed into an isotropic phase. The term "isopropic phase" is meant by uniformity in different orientations or all directions of a liquid crystal.

The crosslinking agent may include one or more selected from the group consisting of trimethylolpropane triacrylate (TMPTA), 1,6-hexanediol-diacrylate (HDDA), and di-(ethylene glycol)divinyl ether (DEGDVE).

The pre-polymer may include a hydrophobic monomer and a urethane-acrylate-based compound.

The liquid crystal material may include a cyano biphenyl group.

The liquid crystal material may include one or more compounds selected from the following Compound Group 1:

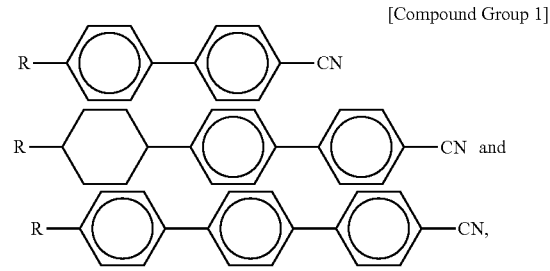

[Compound Group 1]

wherein R is a substituted or unsubstituted alkyl group. For example, the R may be a substituted or unsubstituted $C_1$-$C_{30}$ alkyl.

The liquid crystal layer may include an amount of about 2 to 10 parts by weight of the pre-polymer, an amount of about 70 to 85 parts by weight of the liquid crystal material, and an amount of about 2 to 10 parts by weight of the crosslinking agent, based on the 100 parts by weight of the liquid crystal material.

In another aspect, provided is a vehicle including a body unit and a window connected to the body unit. The window may include the liquid crystal film as described herein. The liquid crystal film may include a first electrode, a polymer-dispersed liquid crystal molecular layer provided on the first electrode, and a second electrode provided on the liquid crystal layer. The polymer-dispersed liquid crystal layer may suitably include a pre-polymer, a liquid crystal material, and a crosslinking agent.

Other aspects of the invention are disclosed infra.

DETAILED DESCRIPTION

Figure 1A:
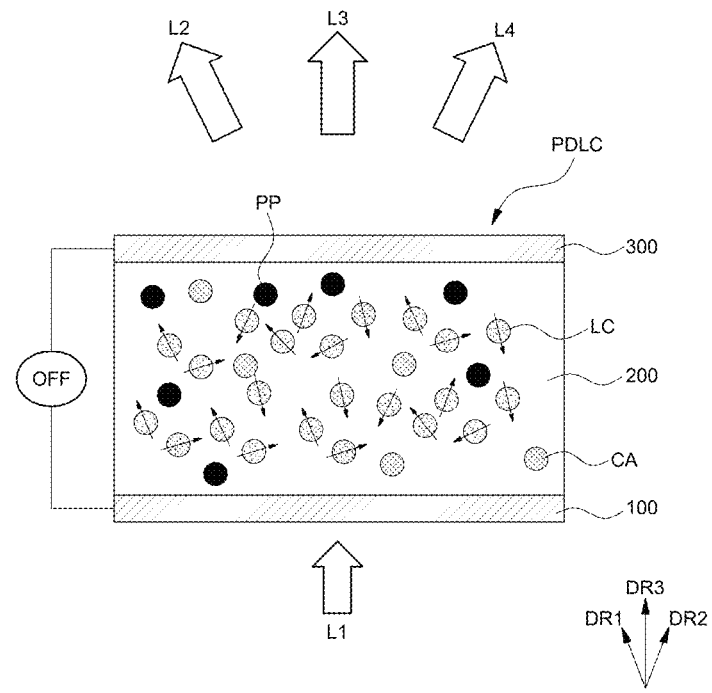
FIG. 1A is a cross-sectional view schematically showing an exemplary polymer-dispersed liquid crystal film for a vehicle when voltage is not applied thereto, according to an exemplary embodiment of the present invention.

The above and other aspects, features and advantages of the present invention will be more clearly understood from the following preferred embodiments taken in conjunction with the accompanying drawings. However, the present invention is not limited to the embodiments disclosed herein, but may be modified into different forms. These embodiments are provided to thoroughly explain the invention and to sufficiently transfer the spirit of the present invention to those skilled in the art.

Throughout the drawings, the same reference numerals will refer to the same or like elements. For the sake of clarity of the present invention, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present invention. Similarly, the "second" element could also be termed a "first" element. As used herein, the singular forms are intended to include the plural forms as well, unless the context clearly indicates otherwise.

It will be further understood that the terms "comprise", "include", "have", etc. when used in this specification specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. In contrast, when an element such as a layer, film, area, or sheet is referred to as being "under" another element, it can be directly under the other element, or intervening elements may be present therebetween.

The terminology used herein is for the purpose of describing particular embodiments only and is not intended to be limiting. As used herein, the singular forms "a," "an" and "the" are intended to include the plural forms as well, unless the context clearly indicates otherwise.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, a detailed description will be given of a polymer-dispersed liquid crystal film for a vehicle and a vehicle including the same according to embodiments of the present invention.

Figure 1B:
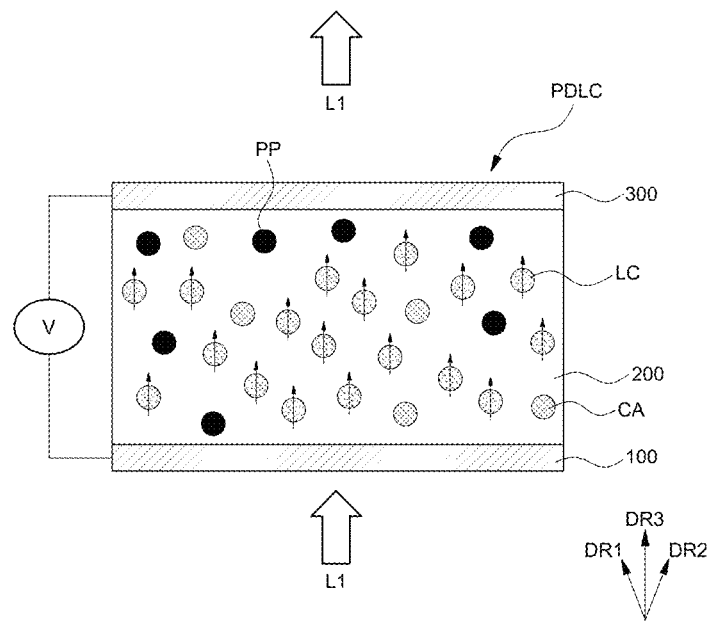
FIG. 1B is a cross-sectional view schematically showing an exemplary polymer-dispersed liquid crystal film for a vehicle when voltage is applied thereto, according to an exemplary embodiment of the present invention.

FIG. 1A is a cross-sectional view schematically showing an exemplary polymer-dispersed liquid crystal film for a vehicle when voltage is not applied thereto, according to an exemplary embodiment of the present invention, and FIG. 1B is a cross-sectional view schematically showing an exemplary polymer-dispersed liquid crystal film for a vehicle when voltage is applied thereto, according to an exemplary embodiment of the present invention.

As shown in FIGS. 1A and 1B, the vehicle according to an exemplary embodiment of the present invention may include a polymer-dispersed liquid crystal film (PDLC). The vehicle according to an embodiment of the present invention may include a body unit and a window. The body unit is the body of the vehicle, and prevents external light from being transmitted to the inside of the vehicle. The window may be connected to the body unit, and may selectively transmit the external light into the inside of the vehicle. The window may include a polymer-dispersed liquid crystal film (PDLC).

The term "vehicle" indicates means for transporting goods, persons, or the like. Examples of the vehicle include land vehicles, marine vehicles and airborne vehicles. The land vehicles may include, for example, cars, including automobiles, vans, trucks, trailer trucks and sports cars, bicycles, motorcycles, trains, etc. The marine vehicles may include, for example, ships, submarines, and the like. The airborne vehicles may include, for example, airplanes, hang gliders, hot-air balloons, helicopters, and small flying bodies such as drones, and the like.

As described above, the polymer-dispersed liquid crystal film (PDLC) for a vehicle according to an exemplary embodiment of the present invention may be, for example, a window of a vehicle. Examples of the window may include, but are not limited to, sunroofs, windows, etc., and the window may be a back minor, a side minor, etc.

The polymer-dispersed liquid crystal film (PDLC) for a vehicle according to an exemplary embodiment of the present invention may include a first electrode 100, a polymer-dispersed liquid crystal molecular layer 200, and a second electrode 300. The first electrode 100 may be, for example, a cathode. The first electrode 100 may preferably be transparent. As used herein, the term "transparent" means that the applied light is transmitted in an amount of 95% or greater. The material for the first electrode 100 is not particularly limited, so long as it is typically useful in the related art. For example, the first electrode may suitably include one or more selected from the group consisting of ITO (indium tin oxide), IZO (indium zinc oxide), ZnO (zinc oxide), and ITZO (indium tin zinc oxide).

The polymer-dispersed liquid crystal molecular layer 200 may be provided on the first electrode 100. The polymer-dispersed liquid crystal molecular layer 200 may have a transition temperature of about 100° C. to 120° C., at which a nematic phase is transformed into an isotropic phase. When the transition temperature is less than about 100° C., the liquid crystal phase may become close to a liquid phase at a high temperature greater than about 70° C., and thus the film (PDLC) may turn transparent, whereby the performance of the polymer-dispersed liquid crystal film (PDLC) may be undesirably lost. When the transition temperature is greater than about 120° C., the properties of the polymer-dispersed liquid crystal film (PDLC) may be unsuitable for use in the window of a vehicle.

The polymer-dispersed liquid crystal layer 200 may include a pre-polymer (PP), a liquid crystal material (LC), and a crosslinking agent (CA). The pre-polymer (PP), the liquid crystal material (LC), and the crosslinking agent (CA) may suitably be dispersed in the polymer-dispersed liquid crystal layer 200.

The polymer-dispersed liquid crystal layer 200 may suitably include an amount of about 2 to 10 parts by weight of the pre-polymer (PP), an amount of about 70 to 85 parts by weight of the liquid crystal material (LC), and an amount of about 2 to 10 parts by weight of the crosslinking agent (CA), based on 100 parts by weight of the liquid crystal layer 200. When the amount of the pre-polymer (PP) is less than about 2 parts by weight, the amount of the pre-polymer (PP) may not be sufficient, and thus the transition temperature, at which a nematic phase is transformed into an isotropic phase, may not be reached to a temperature of about 100° C. or greater. When the amount of the pre-polymer (PP) is greater than about 10 parts by weight, the relative amount of the liquid crystal material (LC) may be decreased, and thus the performance of the polymer-dispersed liquid crystal film (PDLC) may deteriorate.

When the amount of the liquid crystal material (LC) is less than about 70 parts by weight, the amount of the liquid crystal material (LC) may not be sufficient, and thus the performance of the polymer-dispersed liquid crystal film (PDLC) may deteriorate. When the amount of the liquid crystal material (LC) is greater than about 85 parts by weight, the amounts of the pre-polymer (PP) and the crosslinking agent (CA) may not be sufficient, and thus the transition temperature, at which a nematic phase is transformed into an isotropic phase, may not be reached to 100° C. or greater.

When the amount of the crosslinking agent (CA) is less than about 2 parts by weight, the degree of polymerization of the polymer-dispersed liquid crystal molecular layer 200 may decrease. When the amount of the crosslinking agent (CA) is greater than about 10 parts by weight, the amount of the liquid crystal material (LC) may be relatively decreased, and thus the performance of the polymer-dispersed liquid crystal film (PDLC) may deteriorate.

The pre-polymer (PP) may suitably include, for example, ethyleneglycol dimethacrylate, 1,6-hexanediol diacrylate, or 3,5,5-trimethylhexyl acrylate.

The pre-polymer (PP) suitably include a hydrophobic monomer and a urethane-acrylate-based compound, thus improving miscibility with the liquid crystal material (LC). The term "-based" means that a functional group corresponding to "-" is included.

The hydrophobic monomer may be polar. The hydrophobic monomer may suitably be represented by, for example, Chemical Formula 1 below.

[Chemical Formula 1]

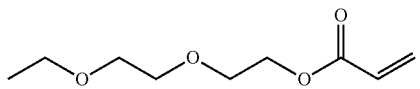

The urethane-acrylate-based compound may suitably include, for example, ethyleneglycol dimethacrylate, 1,6-hexanediol diacrylate, or 3,5,5-trimethylhexyl acrylate.

The liquid crystal material (LC) may include a molecule containing a cyano biphenyl group.

Because, the molecule in the liquid crystal material (LC) contains a cyano biphenyl group, the molecule may be present in a nematic phase across a wide temperature range. As consequence, the properties of the liquid crystal phase may not be lost even at high temperatures.

The liquid crystal material (LC) may include at least one compound selected from among the following Compound Group 1.

[Compound Group 1]

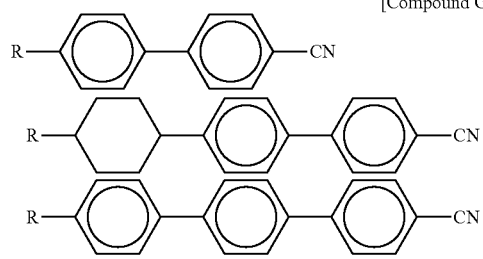

In Compound Group 1, R is a substituted or unsubstituted alkyl group. The term "substituted or unsubstituted" may mean substitution or unsubstitution with at least one substituent selected from the group consisting of deuterium, a halogen group, a nitrile group, a nitro group, an amino group, a silyl group, a boron group, a phosphine oxide group, an alkyl group, an alkoxy group, an alkenyl group, a fluorenyl group, an aryl group and a heterocyclic group. The substituents listed above may themselves be substituted or unsubstituted. For example, the biphenyl group may be interpreted as an aryl group, and may also be interpreted as a phenyl group unsubstituted or substituted with a phenyl group. For example, the R may be a substituted or unsubstituted $C_1$-$C_{30}$ alkyl.

The liquid crystal material may be configured such that the difference in refractive index between a long-axis direction and a short-axis direction is 0.24 to 0.26. When the difference in refractive index falls outside of the above range, the durability of the polymer-dispersed liquid crystal material film (PDLC) may not be reached to a temperature of about 100° C. or greater.

The liquid crystal material may suitably have a refractive index in a short-axis direction of about 1.75 to 1.80. When the refractive index in a short-axis direction falls outside of the above range, the durability of the polymer-dispersed liquid crystal material film (PDLC) may not be increased to a temperature of about 100° C. or greater.

The liquid crystal material may be configured such that the difference in dielectric anisotropy between the long-axis direction and the short-axis direction of the liquid crystal may be about 5.0 to 27.0. When the difference in dielectric anisotropy falls outside of the above range, the durability of the polymer-dispersed liquid crystal material film (PDLC) may not be reached to a temperature of about 100° C. or greater.

As shown in FIG. 1A, when voltage is not applied between the first electrode 100 and the second electrode 300, the liquid crystal material (LC) may be arranged in a random state, for example, a first direction DR1, a second direction DR2, and a third direction DR3, without any specific orientation. Accordingly, first light L1 supplied from below the first electrode 100 may not be transmitted but may be scattered to second light L2, third light L3, and fourth light L4.

As shown in FIG. 1B, when voltage is applied between the first electrode 100 and the second electrode 300, the liquid crystal material (LC) may be arranged from the first electrode 100 toward the second electrode 300, and the first light L1 supplied from below the first electrode 100 may be transmitted to above the second electrode 300, whereby the transmitted first light L1 may be recognized by a user.

When voltage is applied between the first electrode 100 and the second electrode 300, the liquid crystal material (LC) may be arranged in a direction in which current flows from the second electrode 300 toward the first electrode 100. For example, the liquid crystal material (LC) may be arranged in the third direction DR3.

Further, as shown FIGS. 1A and 1B, the crosslinking agent (CA) may increase the degree of polymerization of the polymer-dispersed liquid crystal molecular layer 200, thereby elevating a transition temperature at which a nematic phase is transformed into an isotropic phase. The crosslinking agent (CA) may suitably include one or more selected from the group consisting of trimethylolpropane triacrylate (TMPTA), 1,6-hexanediol-diacrylate (HDDA), and di-(ethylene glycol)divinyl ether (DEGDVE).

The second electrode 300 may be provided on the polymer-dispersed liquid crystal molecular layer 200. The second electrode 300 may be, for example, an anode. The second electrode 300 may be transparent. The material for the second electrode 300 is not particularly limited, so long as it is typically useful in the art, and may suitably include one or more selected from the group consisting of ITO (indium tin oxide), IZO (indium zinc oxide), ZnO (zinc oxide), and ITZO (indium tin zinc oxide).

According to an embodiment of the present invention, the polymer-dispersed liquid crystal film for a vehicle may include the crosslinking agent, and may thus have a transition temperature of about 100 to 120° C., at which a nematic phase is transformed into an isotropic phase, ultimately exhibiting high durability even at a high temperature of 100° C. or greater.

EXAMPLE

A better understanding of the present invention will be given through the following examples, which are merely set forth to illustrate, but are not to be construed as limiting the scope of the present invention.

Example 1

A first electrode and a second electrode were manufactured using ITO. As a pre-polymer, a mixture of ethyleneglycol dimethacrylate, 1,6-hexanediol diacrylate, and 3,5,5-trimethylhexyl acrylate was used, and as a liquid crystal material, a single liquid crystal including 4-cyclohexylbiphenyl as a central frame and a cyano functional group was used. The pre-polymer, the liquid crystal material and the crosslinking agent were used in amounts of 25 wt %, 70 wt % and 5 wt %, respectively, thus manufacturing a polymer-dispersed liquid crystal molecular layer.

Measurement of Properties

The polymer-dispersed liquid crystal film for a vehicle of Example 1 was photographed at room temperature and at a temperature of 110° C. The results thereof are shown in FIGS. 2A and 2B, respectively.

Figure 2A:
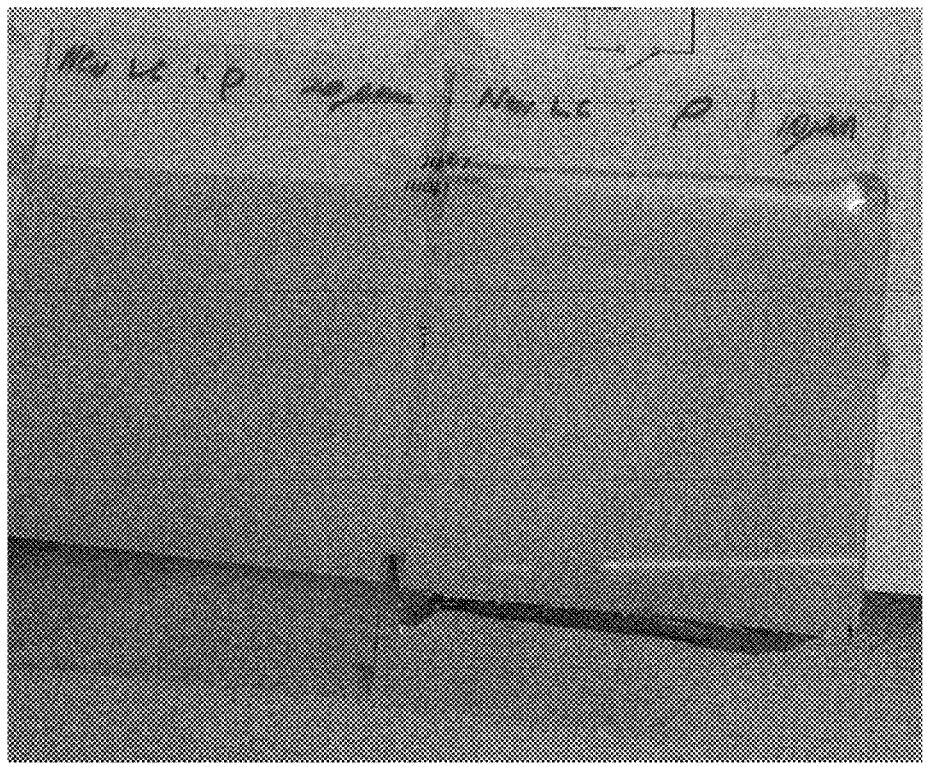
FIG. 2A is a photograph showing an exemplary polymer-dispersed liquid crystal film for a vehicle of Example 1 at room temperature.
Figure 2B:
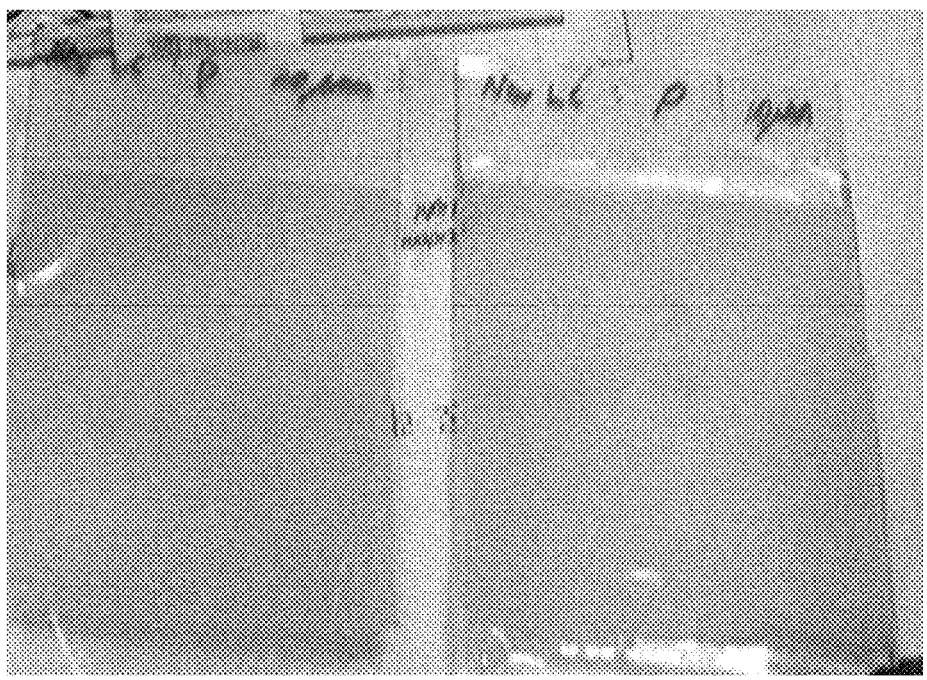
FIG. 2B is a photograph showing an exemplary polymer-dispersed liquid crystal film for a vehicle of Example 1 at 110° C.

With reference to FIGS. 2A and 2B, Example 1 exhibited normal durability without any special problems at a high temperature of 100° C. or greater.

Although exemplary embodiments of the present invention have been described with reference to the accompanying drawings, those skilled in the art will appreciate that the present invention may be embodied in other specific forms without changing the technical spirit or essential features thereof. Thus, the embodiments described above should be understood to be non-limiting and illustrative in every way.

What is claimed is:
1. A liquid crystal film for a vehicle, comprising:
a first electrode;
a liquid crystal molecular layer provided on the first electrode; and
a second electrode provided on the liquid crystal layer,
wherein the liquid crystal layer comprises a pre-polymer, a liquid crystal material, and a crosslinking agent,
wherein the liquid crystal material comprises one or more compounds selected from

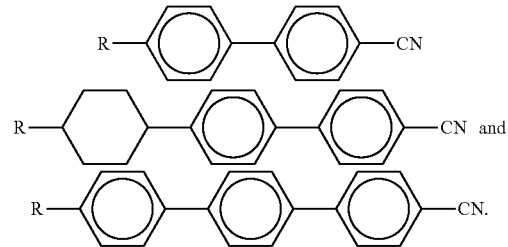

wherein R is a substituted or unsubstituted alkyl group,
wherein the liquid crystal layer comprises:
an amount of 2 to 10 parts by weight of the pre-polymer;
an amount of 70 to 85 parts by weight of the liquid crystal material; and
an amount of 2 to 10 parts by weight of the crosslinking agent,
based on 100 parts by weight of the liquid crystal layer.
2. The liquid crystal film of claim 1, wherein the liquid crystal layer has a transition temperature ranging from 100° C. to 120° C.
3. The liquid crystal film of claim 1, wherein the crosslinking agent comprises one or more selected from the group consisting of trimethylolpropane triacrylate, 1,6-hexanediol-diacrylate, and di-(ethylene glycol)divinyl ether.
4. The liquid crystal film of claim 1, wherein the pre-polymer comprises a hydrophobic monomer and compound comprising ethyleneglycol dimethacrylate, 1,6-hexanediol diacrylate, or 3,5,5-trimethylhexyl acrylate.

* * * * *